United States Patent
Yada et al.

(10) Patent No.: US 8,157,215 B2
(45) Date of Patent: Apr. 17, 2012

(54) DOOR OPENING AND CLOSING APPARATUS FOR AIRCRAFT

(75) Inventors: Wataru Yada, Wako (JP); Hiroshi Yamanouchi, Wako (JP); Hidetaka Nagano, Wako (JP)

(73) Assignee: Honda Patents & Technologies, North America, LLC, Torrance, CA (US)

( * ) Notice: Subject to any disclaimer, the term of this patent is extended or adjusted under 35 U.S.C. 154(b) by 364 days.

(21) Appl. No.: 12/579,050

(22) Filed: Oct. 14, 2009

(65) Prior Publication Data

US 2010/0127124 A1   May 27, 2010

(30) Foreign Application Priority Data

Oct. 14, 2008   (JP) .................................. 2008-265187

(51) Int. Cl.
*B64C 1/14*   (2006.01)
*B64C 1/24*   (2006.01)

(52) U.S. Cl. .................................. 244/129.5; 244/129.6

(58) Field of Classification Search ............... 244/129.4, 244/129.5, 129.6, 118.3, 131, 102 R, 102 A, 244/102 SL, 102 SS, 100 R, 101

See application file for complete search history.

(56) References Cited

U.S. PATENT DOCUMENTS

| | | | | |
|---|---|---|---|---|
| 2,097,991 A | * | 11/1937 | Sikorsky ................... | 244/129.6 |
| 2,931,599 A | * | 4/1960 | McQuilkin ................ | 244/129.6 |
| 2,933,149 A | * | 4/1960 | Lee ................................... | 182/78 |
| 4,199,120 A | * | 4/1980 | Bergman et al. ........... | 244/129.5 |
| 5,018,687 A | * | 5/1991 | Kupfernagel et al. ..... | 244/129.5 |
| 6,068,215 A | * | 5/2000 | Gruensfelder et al. .... | 244/129.5 |
| 7,677,494 B2 | * | 3/2010 | Yada et al. ................. | 244/118.3 |

FOREIGN PATENT DOCUMENTS

JP   2008-110746 A   5/2008

* cited by examiner

*Primary Examiner* — Joshua J Michener
*Assistant Examiner* — Brian M O'Hara
(74) *Attorney, Agent, or Firm* — Birch, Stewart, Kolasch & Birch, LLP (57) ABSTRACT

A door opening and closing mechanism for opening and closing the door from the inside of a fuselage. A door pivotally supported at an opening portion of the fuselage includes first and second position restricting links each having one end pivotally supported on the fuselage with a door driving link having one end pivotally supported on the door. The other end of the second position restricting link is pivotally supported on a middle portion of the door driving link. The door opening/closing operation lever is provided at one end with a grip with the other end pivotally supported on the other end of the door driving link. The middle portion of the door opening/closing operation lever is pivotally supported on the other end of the first position restricting link. By pulling the grip toward the inside of the fuselage and thereafter pushing downward, the door can be closed.

20 Claims, 10 Drawing Sheets

WHEN DOOR IS FULLY OPENED

FIG.8
WHEN DOOR IS PARTIALLY OPENED

FIG.9

IMMEDIATELY BEFORE DOOR IS FULLY CLOSED

FIG.10
WHEN DOOR IS FULLY CLOSED

DOOR OPENING AND CLOSING APPARATUS FOR AIRCRAFT

CROSS-REFERENCE TO RELATED APPLICATIONS

The present application claims priority under 35 USC 119 to Japanese Patent Application No. 2008-265187 filed on Oct. 14, 2008 the entire contents of which are hereby incorporated by reference.

BACKGROUND OF THE INVENTION

1. Field of the Invention

The present invention relates to a door opening and closing apparatus for an aircraft, in which a door for opening and closing an opening portion of a fuselage is pivotally supported at a lower end thereof on the fuselage, and is driven to open and close by a door opening and closing mechanism that is operated by a crew member from inside of the fuselage.

2. Description of Background Art

As disclosed in Japanese Patent Application Laid-open No. 2008-110746, an apparatus is known wherein a lower end of a door is pivotally supported on a lower end of an opening portion formed in a side surface of a fuselage of a business aircraft. A door opening/closing operation lever is provided inside the fuselage wherein a crew member operates the door opening/closing operation lever so that the door connected to the door opening/closing operation lever is manually swung from an opened position to a closed position thereof.

The above-described conventional apparatus has the following problem. The door opening/closing operation lever has a base end pivotally supported on the inner surface of the fuselage with a fulcrum pin and a tip end extending toward the inside of the fuselage. When the door is located in the opened position, the door opening/closing operation lever extends downward along the inner surface of the fuselage from the fulcrum pin. On the other hand, when the door is located in the closed position, the door opening/closing operation lever extends upward along the inner surface of the fuselage from the fulcrum pin. Accordingly, in order to close the door from the opened position to the closed position, a crew member needs to perform an operation of pulling upward the door opening/closing operation lever while holding the tip end of the lever. Since the diameter of the fuselage of a business aircraft is relatively small, the crew member is required to perform the operation of pulling upward the door opening/closing operation lever in a semi-crouching posture. This operation requires a large force, which increases the load on the operation by the crew member.

SUMMARY OF THE INVENTION

The present invention has been made in view of the above-described circumstances. An object of an embodiment of the present invention is to reduce the load on the operation by a crew member when the crew member swings a door of an aircraft from an opened position to a closed position by operating a door opening/closing operation lever.

In order to achieve the object according to an embodiment of the present invention, there is provided a door opening and closing apparatus for an aircraft comprising a door opening and closing mechanism, in which a door for opening and closing an opening portion of a fuselage is pivotally supported at a lower end thereof on the fuselage, and is driven to be opened and closed by the door opening and closing mechanism that is operated by a crew member from inside of the fuselage. The door opening and closing mechanism includes a first position restricting link having one end pivotally supported on the fuselage; a second position restricting link having one end pivotally supported on the fuselage; a door driving link having one end pivotally supported on the door, the other end of the second position restricting link being pivotally supported on a middle portion of the door driving link; and a door opening/closing operation lever provided at one end thereof with a grip for being held by a crew member. The other end of the door opening/closing operation lever is pivotally supported on the other end of the door driving link with a middle portion of the door opening/closing operation lever being pivotally supported on the other end of the first position restricting link. The door driving link is pulled upward so as to swing the door from an opened position to a closed position thereof by pulling the grip of the door opening/closing operation lever toward the inside of the fuselage and thereafter pushing downward the grip.

According to an embodiment of the present invention, the door opening and closing mechanism is provided for opening and closing, by a crew member from the inside of the fuselage. The door includes the lower end pivotally supported at the opening portion of the fuselage and includes the first position restricting link, the second position restricting link, the door driving link, and the door opening/closing operation lever. The first position restricting link has the one end pivotally supported on the fuselage. The second position restricting link has the one end pivotally supported on the fuselage. The door driving link has the one end pivotally supported on the door and the other end of the second position restricting link is pivotally supported on the middle portion of the door driving link. The door opening/closing operation lever is provided at the one end with a grip for being held by the crew member. The other end of the door opening/closing operation lever is pivotally supported on the other end of the door driving link. The middle portion of the door opening/closing operation lever is pivotally supported on the other end of the first position restricting link. Accordingly, with the operation of pulling the grip of the door opening/closing operation lever toward the inside of the fuselage and thereafter pushing downward the grip, the door driving link can be pulled upward so as to swing the door from the opened position to the closed position. The crew member can apply a force to the door opening/closing operation lever by utilizing the crew member's own weight when pulling the grip of the door opening/closing operation lever toward the inside of the fuselage as well as when pushing downward the grip. As a result, the crew member is enabled to close the door with a small force. Thus, the load on the operation by the crew member is reduced.

According to an embodiment of the present invention, there is provided the door opening and closing apparatus for an aircraft that further includes a plurality of steps on an inner surface of the door, wherein in association with the swing of the door between the opened position and the closed position, each of the plurality of steps is swung between an expanded position and a stored position thereof by a boarding-steps driving mechanism.

According to an embodiment of the present invention, each of the plurality of steps provided on the inner surface of the door is swung between the expanded position and the stored position by the boarding-steps driving mechanism in association with the swing of the door between the opened position and the closed position. This enables boarding and embarking of passengers by expanding the steps when the door is opened, and also effective utilization of the interior space of the fuselage by storing the steps when the door is closed.

According to an embodiment of the present invention, the plurality of steps comprise an upper step, a middle step, and a lower step, and the boarding-steps driving mechanism includes an upper-step supporting link connecting, to the door, the upper step swingably and pivotally supported on the door; an upper-step driving link connecting the door driving link to the upper-step supporting link; a middle-step supporting link connecting, to the door, the middle step pivotally supported on the door; a middle-step driving link connecting the upper-step supporting link to the middle-step supporting link; a lower-step supporting link connecting the lower step to the middle step; and a lower-step driving link connecting the middle-step supporting link to the lower-step supporting link.

According to an embodiment of the present invention, the upper step, the middle step, and the lower step are linked to one another by the boarding-steps driving mechanism. Accordingly, when the door opening/closing operation lever is operated, the upper step pivotally supported on the door and linked to the door via the upper-step supporting link is swung by the door driving link, the middle step pivotally supported on the door and linked to the door via the middle-step supporting link is swung by the middle-step driving link, and the lower step supported on the middle step via the lower-step supporting link is swung by the lower-step driving link. In this way, each of the steps can be automatically moved between the expanded position and the stored position in association with the operation of the door opening/closing operation lever. In this event, since the boarding-steps driving mechanism is constituted of only the links, and uses no gear, no sprocket, no chain, and the like. As a result, it is possible to simplify the structure, and thus reduce the number of components, the weight, and the cost.

According to an embodiment of the present invention, when the door is located at the opened position, the door opening/closing operation lever extends along the direction of the arrangement of the plurality of steps so as to function as a grab rail.

According to an embodiment of the present invention, when the door is located at the opened position, the door opening/closing operation lever extends in the direction of the arrangement of the plurality of steps so as to function as a grab rail. Accordingly, using the door opening/closing operation lever as the grab rail makes it possible to reduce the number of components, the weight, and the cost.

According to an embodiment of the present invention, a fulcrum pin with which the other end of the door opening/closing operation lever is pivotally supported on the other end of the door driving link is located outside the fuselage at least when the door is located at the opened position.

According to an embodiment of the present invention, the fulcrum pin with which the other end of the door opening/closing operation lever is pivotally supported on the other end of the door driving link is located outside the fuselage at least when the door is located at the opened position. Accordingly, if the length of the door opening/closing operation lever is supposed to be the same, the amount by which the door opening/closing operation lever in operation projects to the inside of the fuselage can be reduced as compared with a case where the fulcrum pin is provided on the fuselage. As a result, it is possible to effectively utilize the space by avoiding the interference of the door opening/closing operation lever with the other components inside the fuselage.

An upper step 13, a middle step 14, and a lower step 15 of an embodiment correspond to a step of the present invention; a first upper-step supporting link 43 and a second upper-step supporting link 45 of the embodiment correspond to an upper-step supporting link of the present invention; a first upper-step driving link 47 and a second upper-step driving link 49 of the embodiment correspond to an upper-step driving link of the present invention; a first middle-step supporting link 66 and a second middle-step supporting link 63 of the embodiment correspond to a middle-step supporting link of the present invention; and a first lower-step supporting link 71 and a second lower-step supporting link 73 correspond to a lower-step supporting link of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

An embodiment of the present invention will be described below based on the attached drawings.

Figure 1:
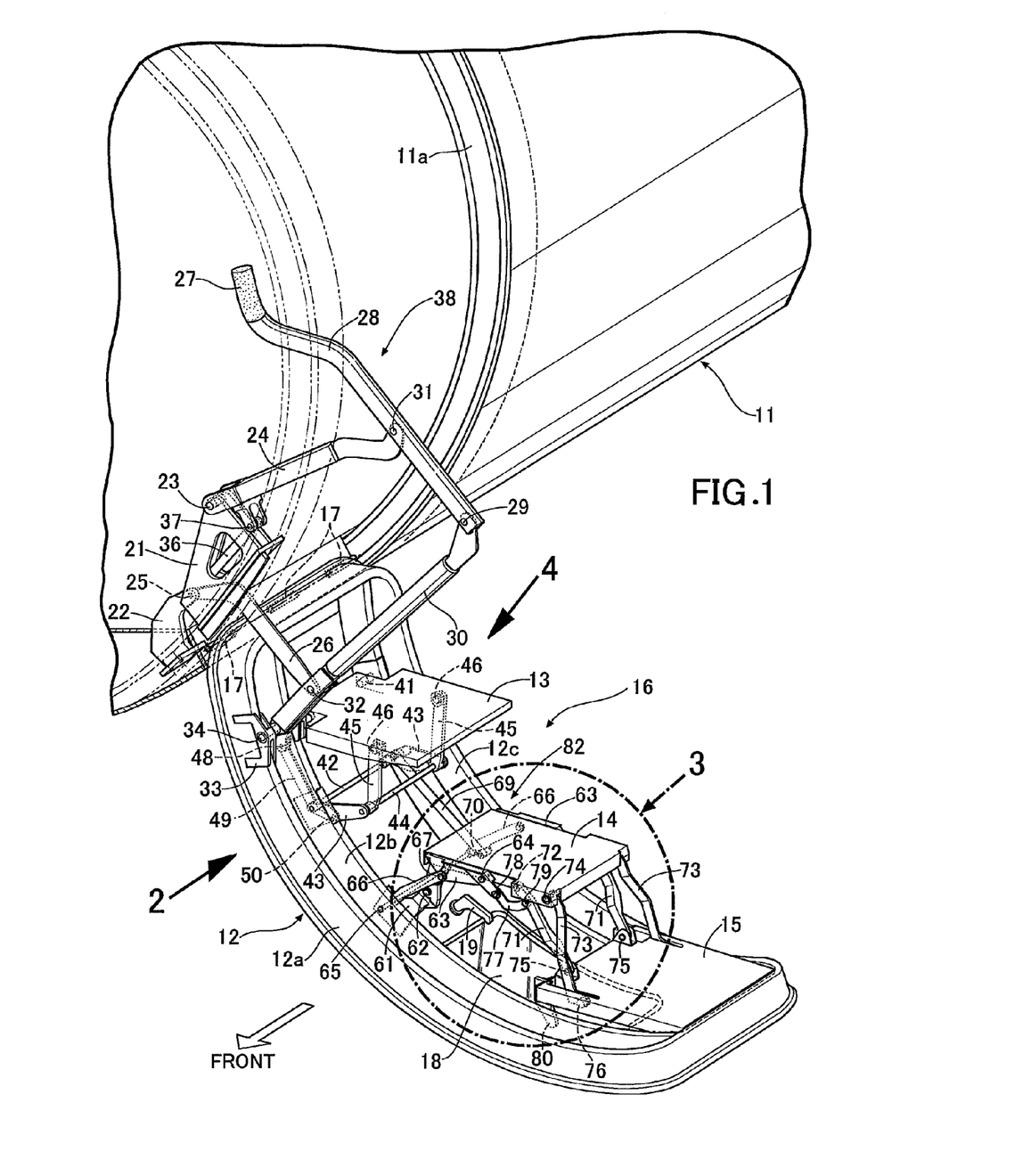
FIG. 1 is a perspective view showing a door of an airplane in a state in which the door is fully open.

As illustrated in FIG. 1, an opening portion 11a is formed in a left-side surface of a front portion of a fuselage 11 of an airplane, such as a business aircraft. The opening portion 11a is opened and closed by a door 12 constituting a part of the fuselage 11. A folding-type boarding steps 16 including an upper step 13, a middle step 14, and a lower step 15 are provided on an inner surface (a surface facing a cabin) of the door 12. The door 12 is openable and closable about a door hinge 17 being provided to a lower edge of the door 12 and serving as the fulcrum thereof. The upper step 13, the middle step 14, and the lower step 15, of the boarding steps 16 are expanded to be usable for embarkment and disembarkment of passengers in a state where the door 12 is fully opened, and are stored at positions along the inner surface of the door 12 in association with the operation of closing the door 12 (see FIG. 10). A window 18 is provided in an upper portion of the door 12, and a locking lever 19 for locking the door 12 at its closed position is provided to the inner surface of the door 12.

Figure 10:
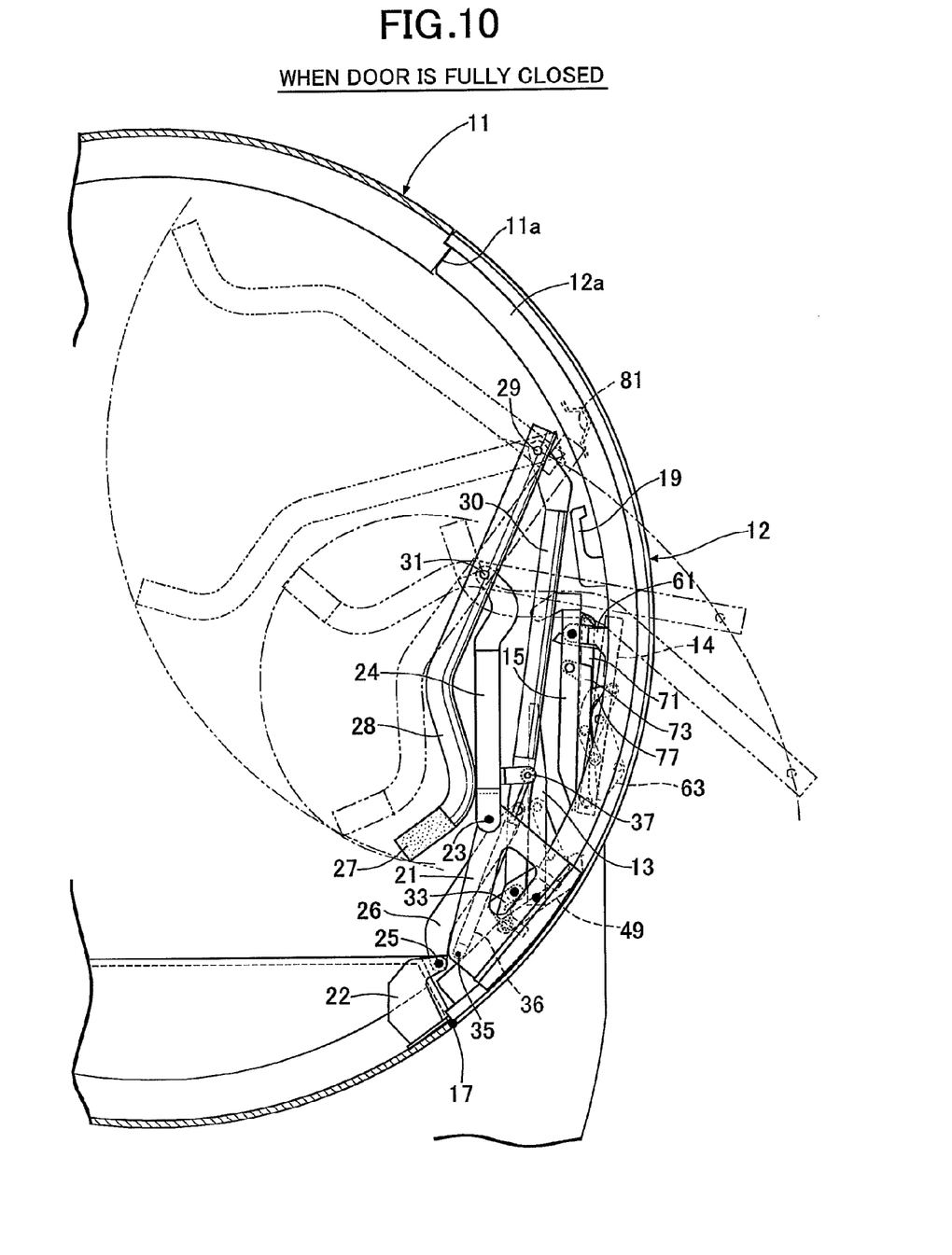
FIG. 10 is an operation explanatory view showing a state in which the door is fully closed.

It should be noted that, in the specification, an "upper end" and a "lower end" of the door 12 are defined respectively as the "upper end" and the "lower end" of the door 12 in its closed state (see FIG. 10). In addition, the terms of the "upper" step 13, the "middle" step 14, and the "lower" step 15 are given on the basis of the state where the door 12 is opened (see FIG. 1). In this respect, the upper step 13 is provided at a lower end side of the door 12, the lower step 15 is provided at an upper end side of the door 12, and the middle step 14 is provided at a middle position therebetween.

Figure 6:
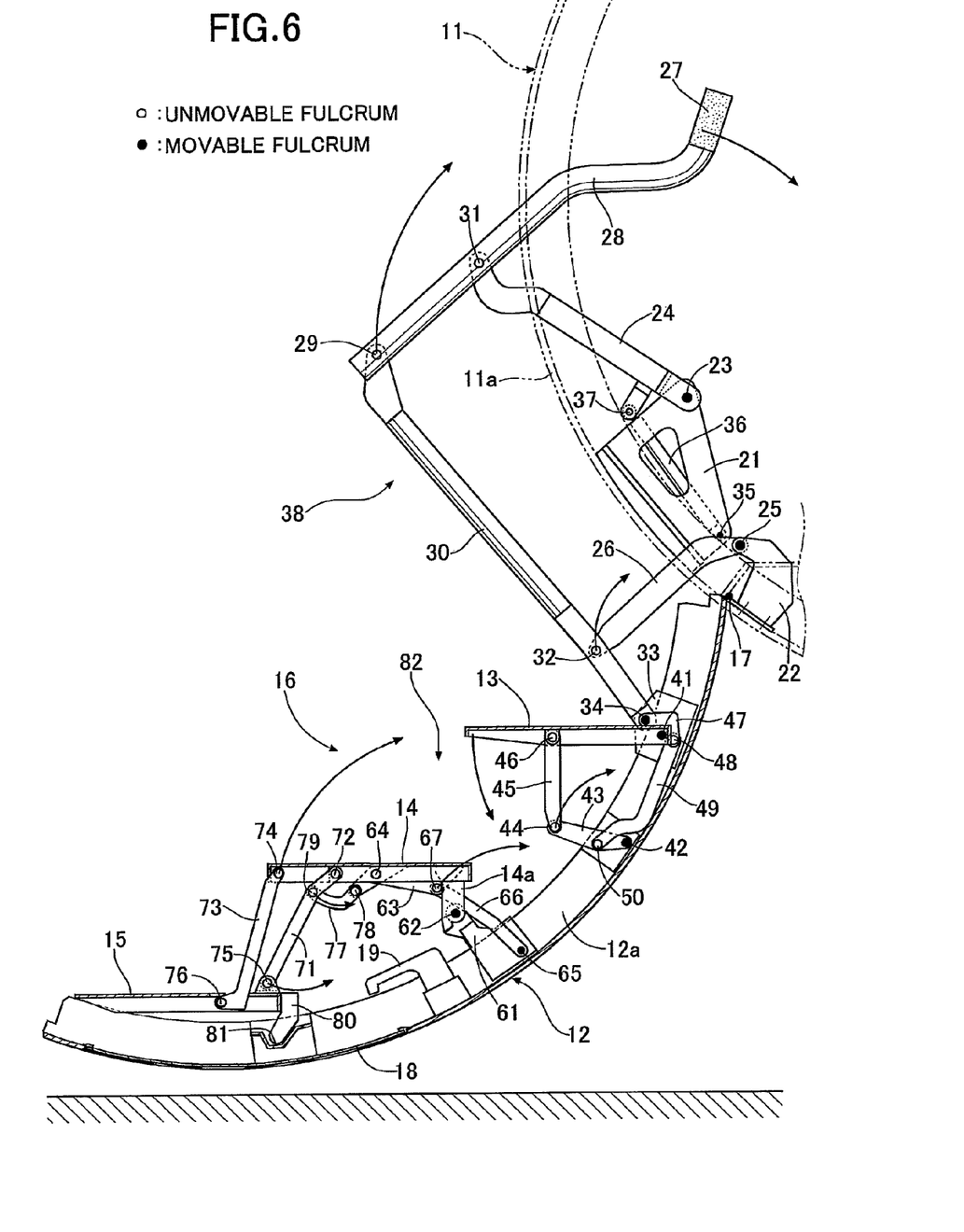
FIG. 6 is a cross-sectional view taken along a line 6-6 in FIG. 5.
Figure 7:
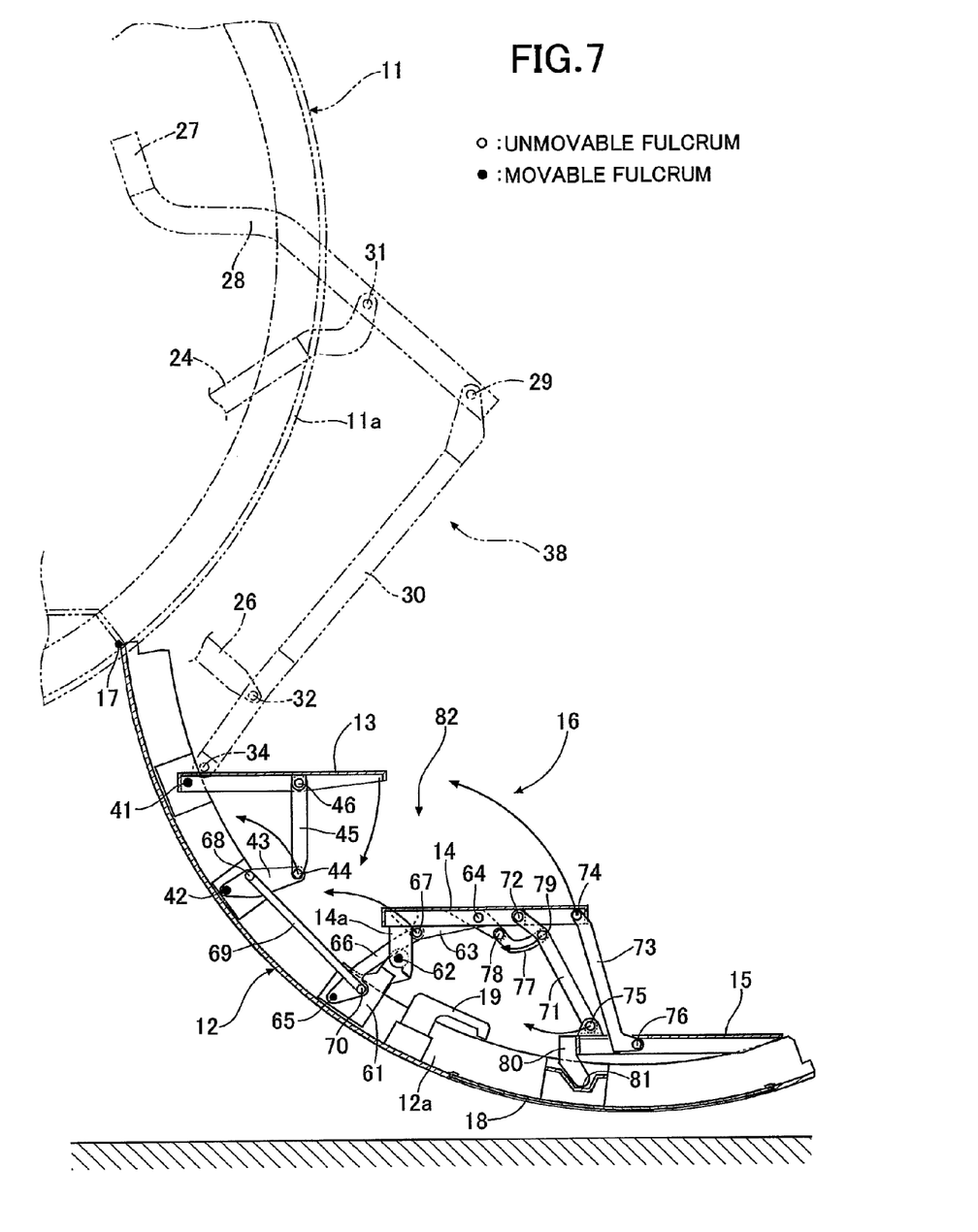
FIG. 7 is a cross-sectional view taken along a line 7-7 in FIG. 5.

In addition, in FIGS. 6 and 7, a black dot indicates a fulcrum that is not movable with respect to the fuselage 11 or the door 12, and a white dot indicates a fulcrum that is movable with respect to the fuselage 11 or the door 12.

At the outset, a structure for opening and closing the door 12 manually by a crew member will be described on the basis of FIGS. 1, 2 and 6.

A first bracket 21 and a second bracket 22 are fixed to a front lower portion of the opening 11a of the fuselage 11. One end of a first position restricting link 24 is pivotally supported on the first bracket 21 with a fulcrum pin 23. One end of a second position restricting link 26 is pivotally supported on the second bracket 22 with a fulcrum pin 25. A grip 27 that is held by a crew member is formed on one end of a door opening/closing operation lever 28, and the other end of the door opening/closing operation lever 28 is pivotally supported on one end of a door driving link 30 with a fulcrum pin 29. A middle portion of the door opening/closing operation lever 28 is pivotally supported on the other end of the first position restricting link 24 with a fulcrum pin 31. The other end of the second position restricting link 26 is pivotally supported on a middle portion of the door driving link 30 with a fulcrum pin 32. The other end of the door driving link 30 is fixed to a spindle 34 which is rotatably laid between a pair of brackets 33, 33 (see FIG. 4) provided respectively on a flange 12a and a stiffener 12b on a front edge side of a vicinity of the lower end of the door 12. The first bracket 21 is fixed to the fuselage 11, and one end of a damper 36 is pivotally supported on the first bracket 21 with a fulcrum pin 35 (see FIG. 2). The other end of the damper 36 is pivotally supported on a middle portion of the first position restricting link 24 with a fulcrum pin 37.

Figure 2:
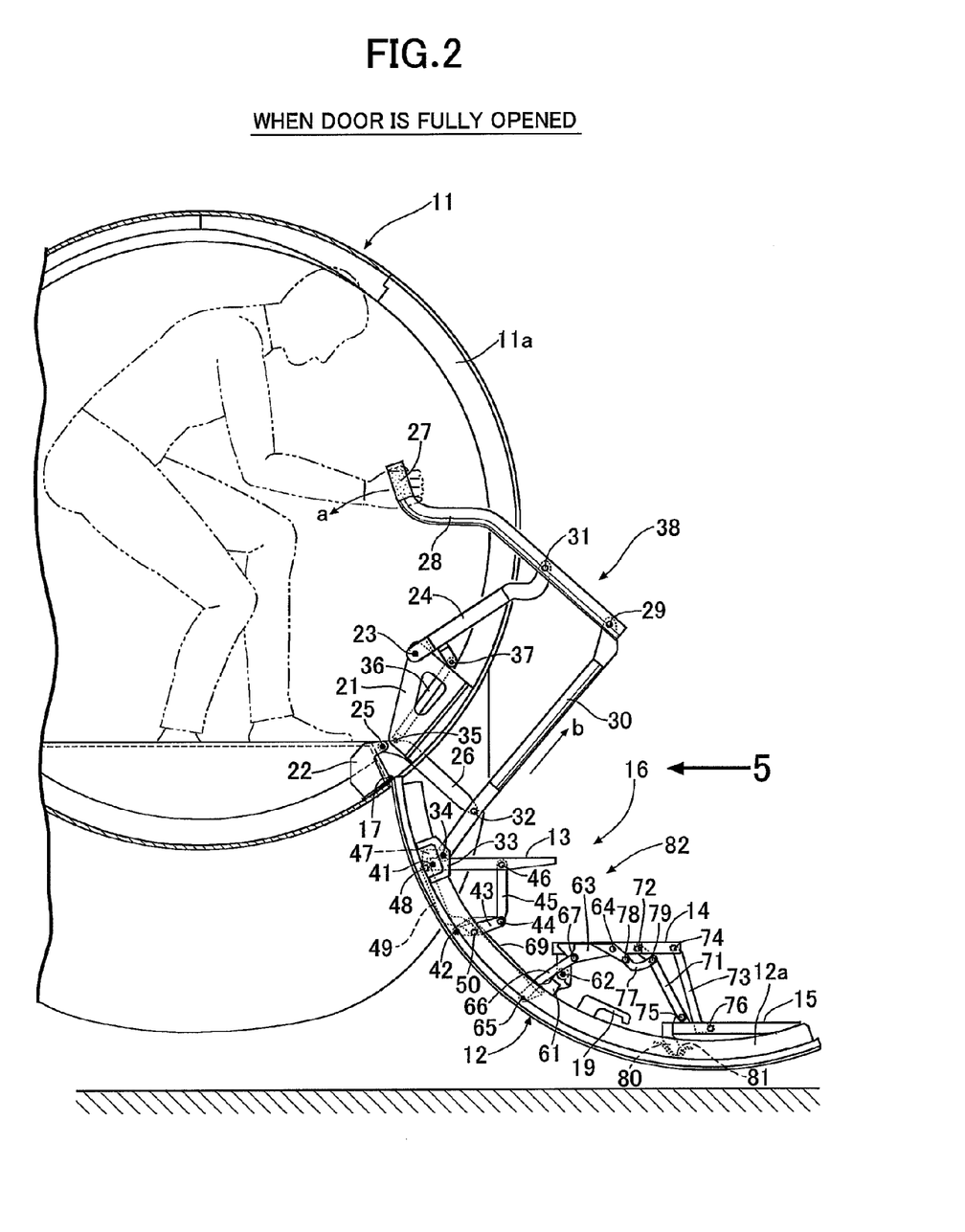
FIG. 2 is a view seen from an arrow 2 in FIG. 1 (an operation explanatory view showing a state in which the door is fully open)
Figure 8:
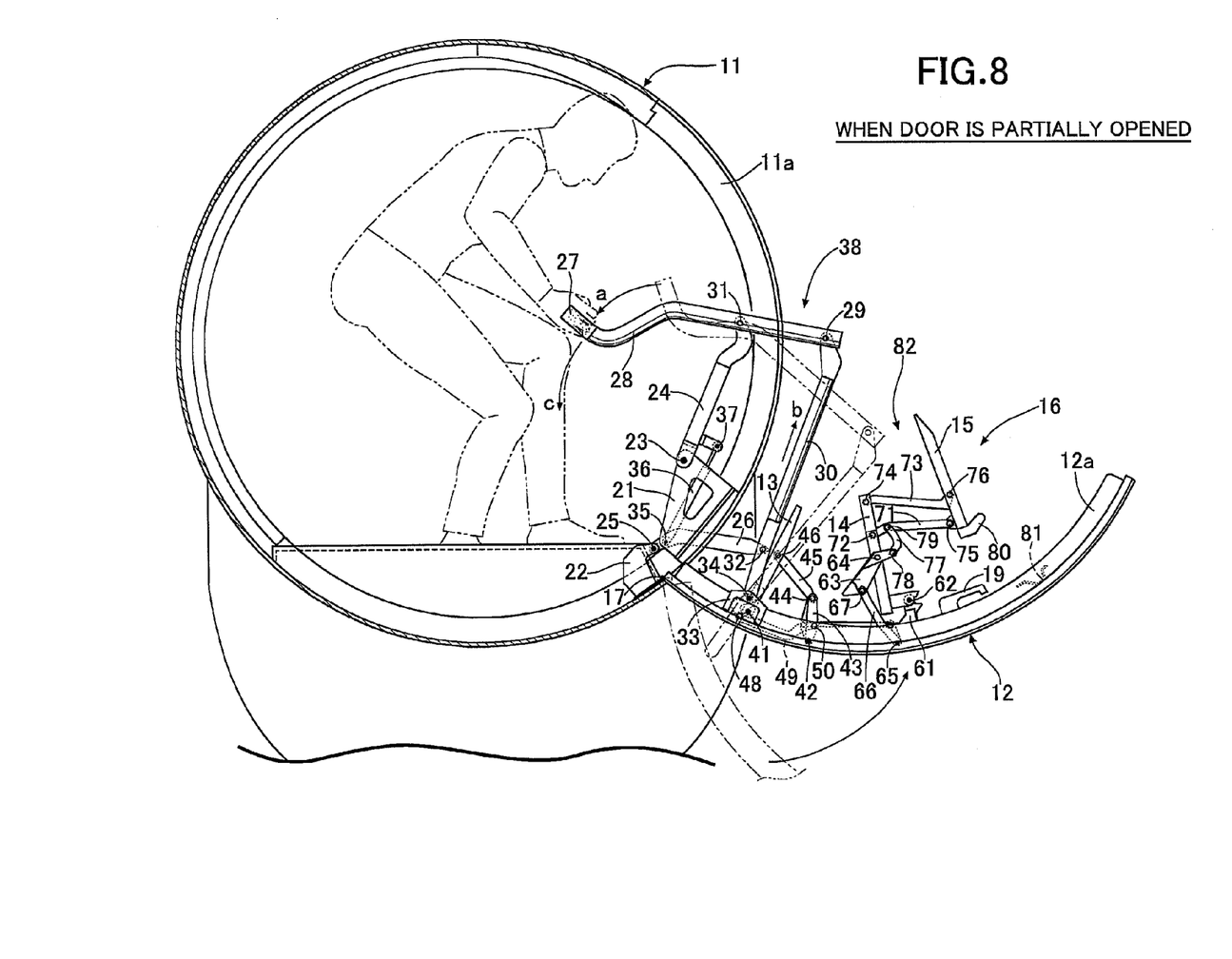
FIG. 8 is an operation explanatory view showing a state in which the door is partially open.

Accordingly, when a crew member pulls the door opening/closing operation lever 28 rearward (toward the inside of the airplane) while holding the grip 27 (see the arrow a in FIGS. 2 and 8) in a fully-opened state of the door 12 shown in FIG. 2, the door driving link 30 is pulled up via the first position restricting link 24 and the second position restricting link 26 (see the arrow b in FIGS. 2 and 8). Thereby, the door 12 having the bracket 33 connected to the door driving link 30 swings in a closing direction about the door hinge 17 into a partially-opened state shown in FIG. 8. In this state, when the crew member pushes downward the door opening/closing operation lever 28 while holding the grip 27 (see the arrow c in FIGS. 8 and 9), the door driving link 30 is further pulled up via the first position restricting link 24 and the second position restricting link 26 (see the arrow b in FIGS. 8 and 9), so that the door 12 is fully closed to be set into the state shown in FIG. 10.

When the first position restricting link 24 swings about the fulcrum pin 23 along with the opening and closing of the door 12, the damper 36 to which the ends of the first position restricting link 24 and the first bracket 21 are connected is expanded and contracted. This action of the damper 36 prevents the door 12 from suddenly falling down with its own weight when the door 12 is moved downward from the closed position to the opened position.

In addition, in the operation of moving the door 12 upward from the opened position to the closed position by a crew member with his or her arm force, the crew member pulls rearward the door opening/closing operation lever 28 (see the arrow a in FIGS. 2 and 8) in the former stage of the operation, and then pushes downward the door opening/closing operation lever 28 (see the arrow c in FIGS. 8 and 9) in the latter stage of the operation. Accordingly, the crew member can apply a force to the door opening/closing operation lever 28 by utilizing the crew member's own weight in either of the stages. For this reason, even a crew member with poor strength can easily close the door 12 with a small force.

The first position restricting link 24, the second position restricting link 26, the door opening/closing operation lever 28, and the door driving link 30 constitute a door opening and closing mechanism 38.

The boarding steps 16 are automatically folded so as not to be an obstacle when the door 12 is fully closed, and are automatically expanded to usable positions when the door 12 is fully opened. Hereinafter, the structure of the boarding steps 16 will be described on the basis of FIGS. 1 to 7.

First, the structure of the upper step 13 will be described, which is expanded and stored in association with the operation of the door opening/closing operation lever 28.

Figure 4:
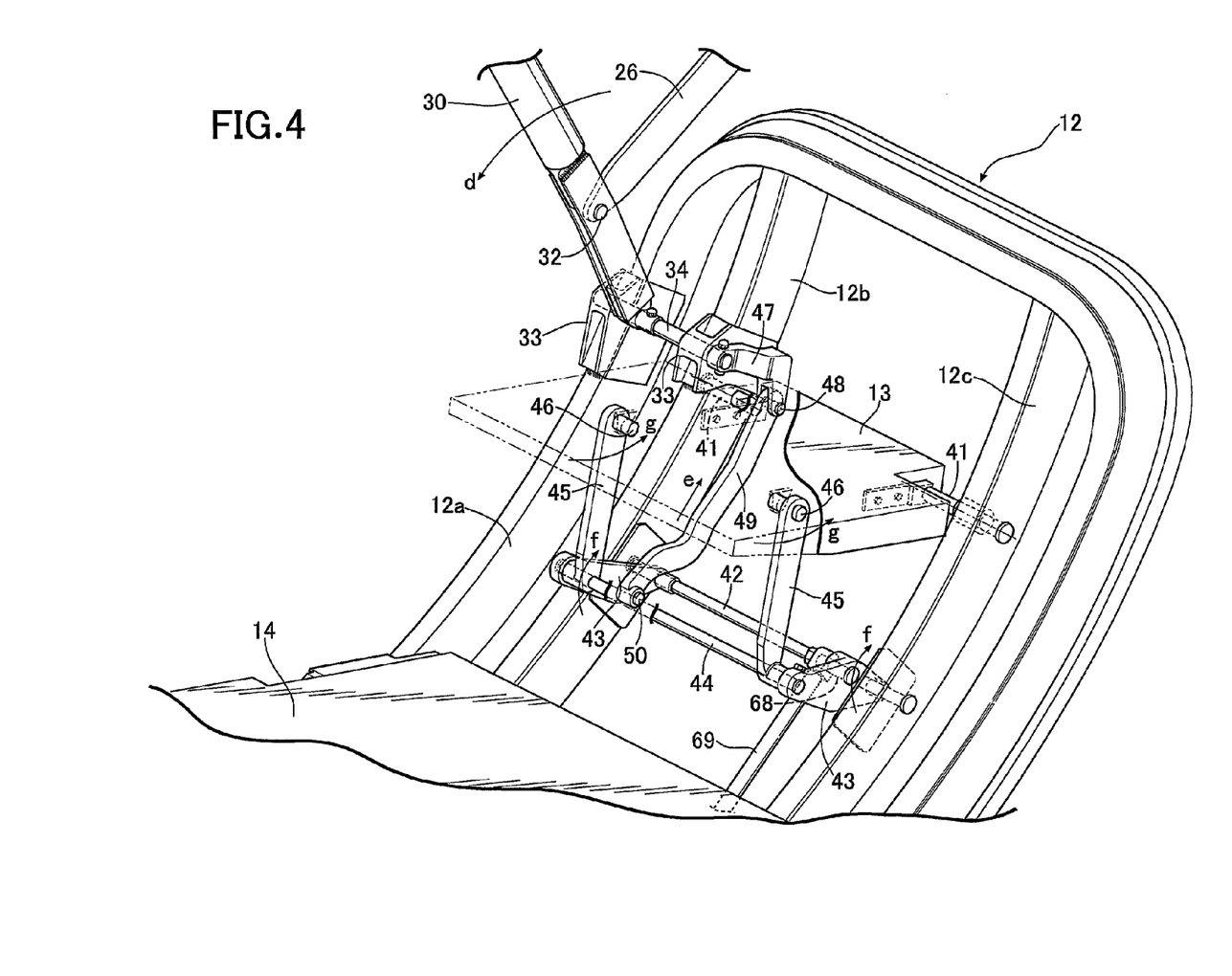
FIG. 4 is a view seen from an arrow 4 in FIG. 1.
Figure 5:
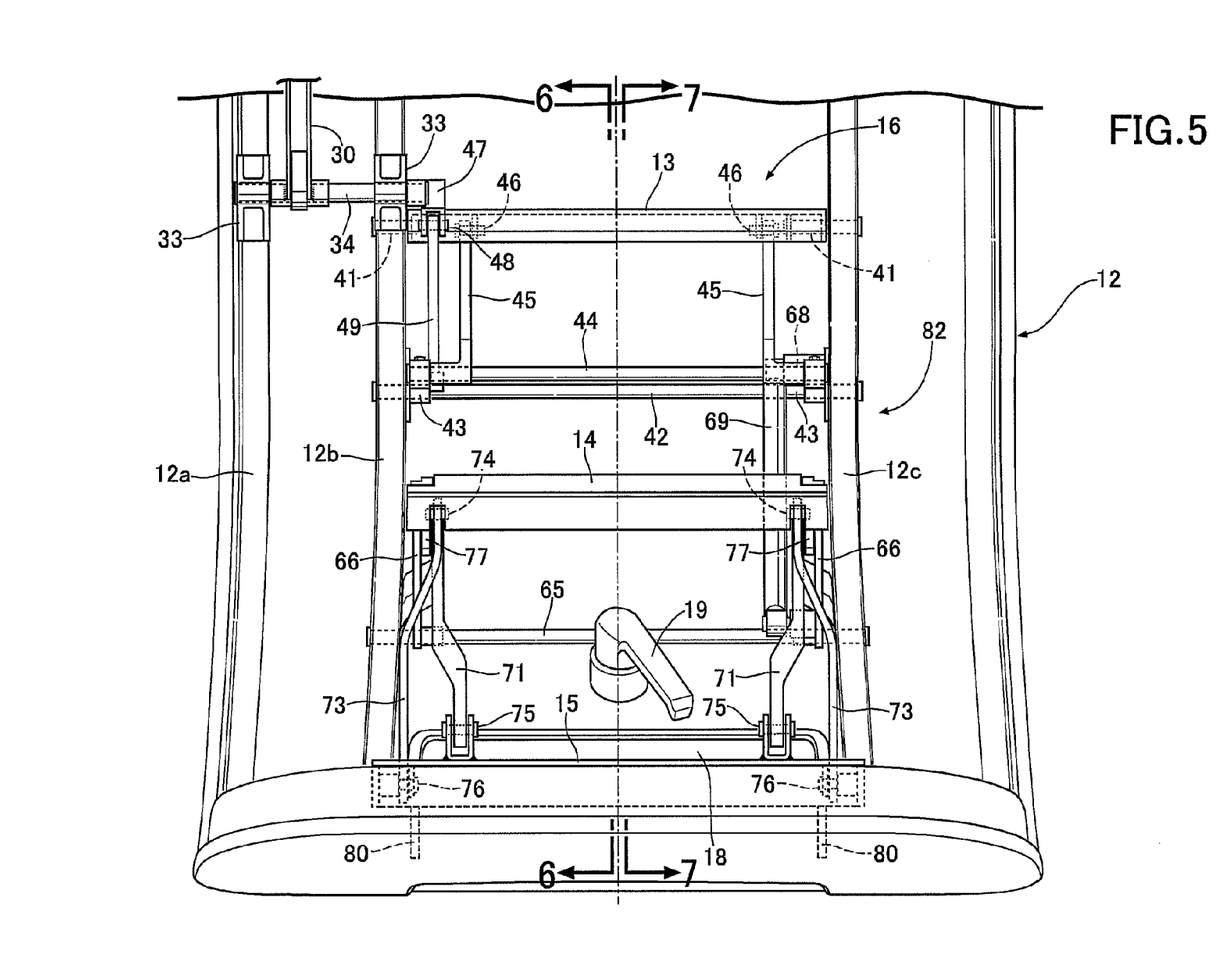
FIG. 5 is a view seen from an arrow 5 in FIG. 2.

As illustrated in FIG. 4, the upper step 13 is pivotally supported, with swing shafts 41, 41, on a pair of the stiffener 12b and a stiffener 12c on the inner surface of the door 12 at the lower end side (the upper side in FIG. 4). A spindle 42 is rotatably laid between the pair of stiffeners 12b and 12c on the upper end side (the lower side in FIG. 4) of the door 12 beyond the swing shafts 41, 41. One ends of a pair of first upper-step supporting links 43, 43 are fixed on the spindle 42. A spindle 44 is rotatably laid between the other ends of the pair of first upper-step supporting links 43, 43, and one ends of a pair of second upper-step supporting links 45, 45 are fixed on the spindle 44. The other ends of the pair of second upper-step supporting links 45, 45 are pivotally supported on a lower surface of the upper step 13 with fulcrum pins 46, 46. One end of an L-shaped first upper-step driving link 47 is fixed on the spindle 34, which is rotatably laid between the brackets 33, 33 provided respectively on the flange 12a and the stiffener 12b of the door 12. The other end of the first upper-step driving link 47 is pivotally supported on one end of a second upper-step driving link 49 with a fulcrum pin 48. The other end of the second upper-step driving link 49 is supported on a middle portion of the first upper-step supporting link 43 on the front side with a fulcrum pin 50.

Accordingly, when a crew member operates the door opening/closing operation lever 28 for closing the door 12, the door driving link 30 is swung in the direction of the arrow d relative to the door 12 in FIG. 4. The swing of the door driving link 30 causes the first upper-step driving link 47 to pull the second upper-step driving link 49 in the direction of the arrow e. As a result, each of the first upper-step supporting links 43, 43 and each of the second upper-step supporting links 45, 45 swing in the direction of the arrow f and in the direction of the arrow g, respectively.

Accordingly, the first upper-step supporting links 43, 43 and the second upper-step supporting links 45, 45, forming a "dogleg" shape at first, are caused to temporarily stand straight, and thereafter, to be bent into an inverted "dogleg" shape. As a result, while swinging toward the lower end side of the door 12 once, the upper step 13 thereafter swings toward the upper end side of the door 12, and eventually, is folded in such a manner so as to be laid along the inner surface of the door 12 in the fully-closed state (see FIG. 10).

As described above, the upper step 13 is stored by utilizing the movement of the door driving link 30 to swing relative to the door 12 (see the arrow d in FIG. 4) in association with the operation of closing the door 12.

Next, the structures of the middle step 14 and the lower step 15 will be described, which are expanded and stored in association with the above-described expansion and storage of the upper step 13.

Figure 3:
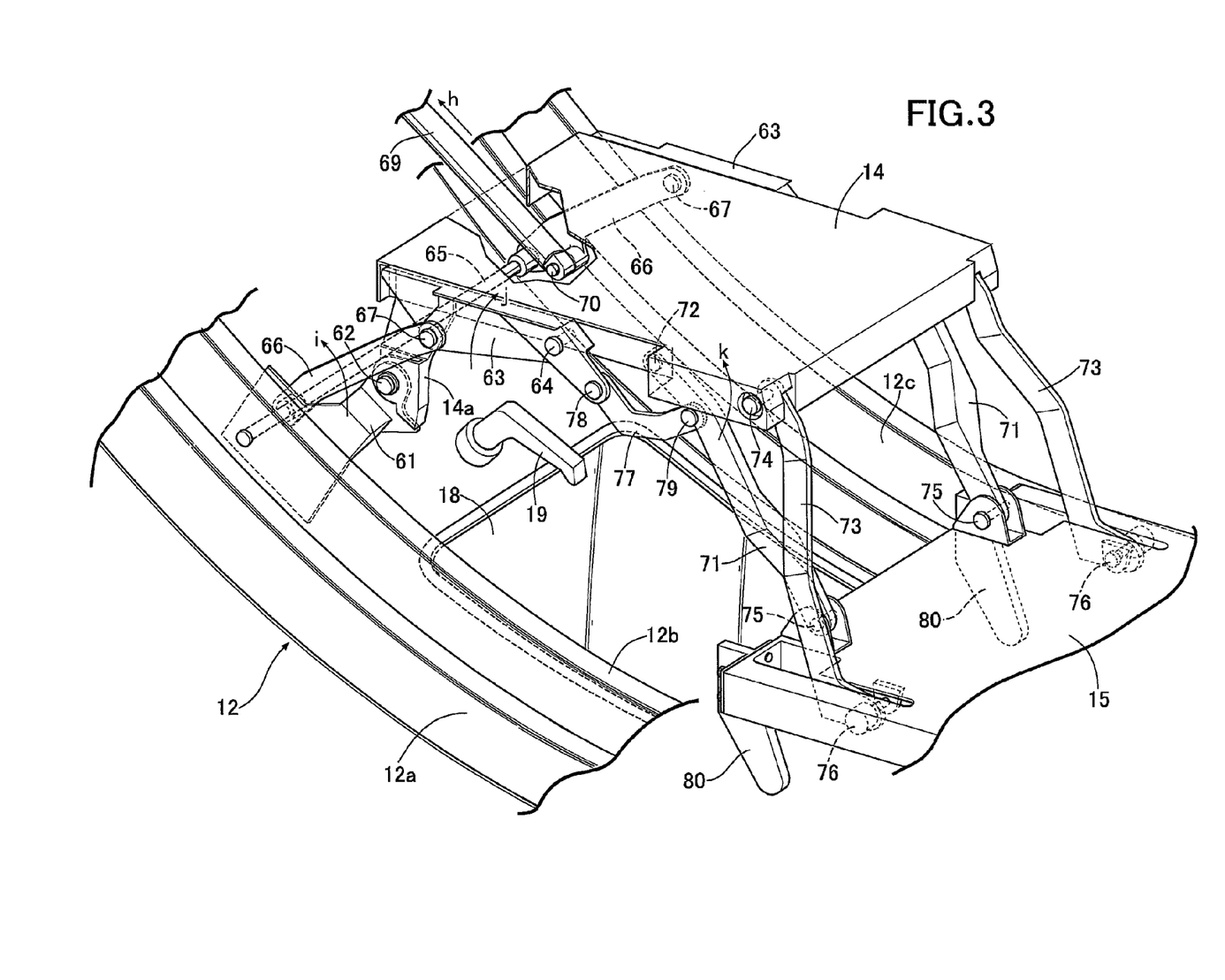
FIG. 3 is an enlarged view of a part 3 in FIG. 1.

As is clear from FIG. 3, a pair of brackets 14a, 14a protrude downward from a base end portion of the middle step 14, and are pivotally supported respectively, with fulcrum pins 62, 62, on a pair of brackets 61, 61 fixed on the stiffeners 12b and 12c on the front and rear sides of the inner surface of the door 12. Middle portions of a pair of second middle-step supporting links 63, 63, each having an inverted "V" shape, are pivotally supported respectively on two side walls of the middle step 14 with fulcrum pins 64, 64. A spindle 65 is rotatably laid between the stiffeners 12b and 12c of the door 12. One end of a pair of first middle-step supporting links 66, 66 are fixed on the spindle 65, and the other end of the first middle-step supporting links 66, 66 are pivotally supported respectively on one ends of the second middle-step supporting links 63, 63 with fulcrum pins 67, 67. One end of a middle-step driving link 69 (see FIGS. 3 and 4) is pivotally supported on the first upper-step supporting link 43 on the rear side with a fulcrum pin 68, and the other end of the middle-step driving link 69 is pivotally supported on a middle portion of the first middle-step supporting link 66 on the rear side with a fulcrum pin 70.

On a tip end portion of the middle step 14, one end of a pair of lower-step supporting links 71, 71 is pivotally supported with fulcrum pins 72, 72, and one end of a pair of second lower-step supporting links 73, 73 is pivotally supported with fulcrum pins 74, 74. On a base end portion of the lower step 15, the other end of the first lower-step supporting links 71, 71 are pivotally supported with fulcrum pins 75, 75, and the other end of the second lower-step supporting links 73, 73 are pivotally supported with fulcrum pins 76, 76. The first lower-step supporting links 71, 71, the second lower-step supporting links 73, 73, the middle step 14, and the lower step 15 constitute a four-bar linkage mechanism when viewed in the front-rear direction of the fuselage 11 (see FIG. 2). In addition, the first lower-step supporting links 71, 71 and the second lower-step supporting links 73, 73 are formed to be bent so as not to overlap when viewed in the left-right direction of the fuselage 11 (see FIG. 5), and are thus designed so as not to interfere with each other when these links are folded. One end of a pair of lower-step driving links 77, 77, each having an inverted "V" shape, are pivotally supported respectively on the other end of the second middle-step supporting links 63, 63 with fulcrum pins 78, 78, and the other end of the lower-step driving links 77, 77 are pivotally supported respectively on middle portions of the first lower-step supporting links 71, 71 with fulcrum pins 79, 79.

A pair of supporting legs 80, 80 are provided to protrude downward on a lower surface of the base end portion of the lower step 15. Receiving portions 81, 81 that are capable of engaging with the supporting legs 80, 80 are provided respectively in side surfaces of the stiffeners 12b and 12c of the door 12. In a state where the boarding steps 16 are expanded, the supporting legs 80, 80 of the lower step 15 are engaged with the receiving portions 81, 81 of the door 12, so that the positions of the supporting legs 80, 80 are restricted. Once the lower step 15 is positioned in this way, the middle step 14 linked to the lower step 15 is positioned, and then the upper step 13 linked to the middle step 14 is positioned.

The group of the above-described links, which link the upper step 13, the middle step 14, and the lower step 15 to one another in a way that the upper, middle, and lower steps 13, 14, and 15 are movable in association with one another, constitutes a boarding-steps driving mechanism 82.

Accordingly, when the upper step 13 is folded in association with the operation of closing the door 12, the middle-step driving link 69 connected to the first upper-step supporting link 43 with the fulcrum pin 68 is pulled in the direction of the arrow h in FIG. 3. As a result, the first middle-step supporting links 66, 66 swing in the direction of the arrow i and the second middle-step supporting links 63, 63 swing in the direction of the arrow j, so that the middle step 14 swings about the fulcrum pins 62, 62 in the direction of the arrow k.

More specifically, when the door 12 is at the opened position, the upper surfaces of the second middle-step supporting links 63, 63 are flush with the upper surface of the middle step 14. The operation of closing the door 12 causes the second middle-step supporting links 63, 63 to rotate relative to the middle step 14. This relative rotation causes the middle step 14 to swing in such a way as to fall down toward the lower end of the door 12 (see FIG. 8). Then, the relative rotation of the middle step 14 and the second middle-step supporting links 63, 63 causes the first lower-step supporting links 71, 71 and the second lower-step supporting links 73, 73 to swing via the lower-step driving links 77, 77. Accordingly, the lower step 15 is folded in such a way as to overlap the lower surface of the middle step 14 while being kept in parallel with the middle step 14 (see FIG. 9).

Figure 9:
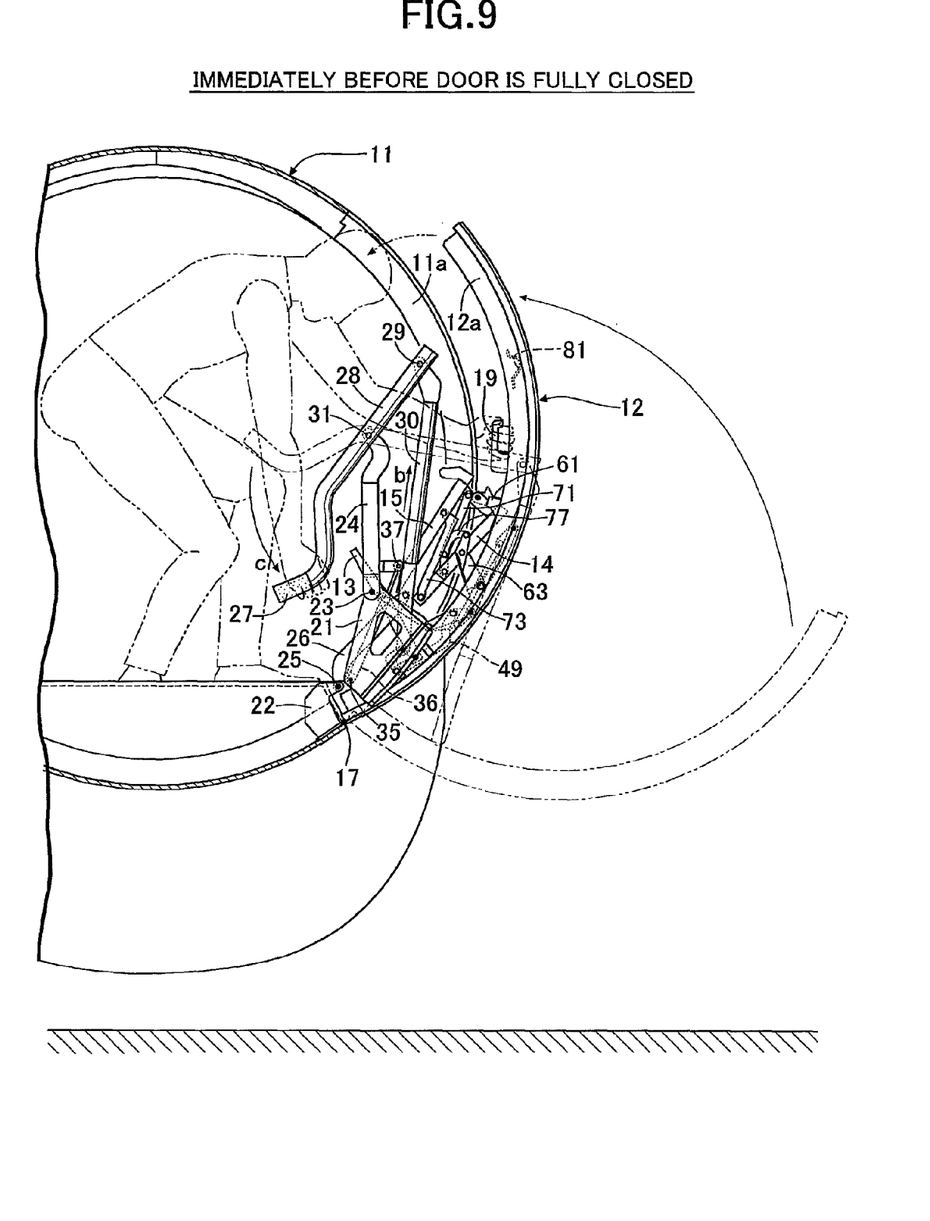
FIG. 9 is an operation explanatory view showing a state immediately before the door is fully closed.

At this time, the upper step 13 is still maintained standing (see FIG. 9). Thereafter, the upper step 13 rapidly falls down toward the upper end of the door 12, and is folded in such a way so as to cover the lower surface of the lower step 15 (see FIG. 10).

Note that, the members constituting the boarding-steps driving mechanism 82 are arranged basically to be symmetric on the front side and the rear side of the door 12; except that the first upper-step driving link 47 and the second upper-step driving link 49, which transmit the driving force of the door driving link 30 to the upper step 13, are provided only on the front side of the door 12, and that the middle-step driving link 69, which transmits the driving force of the upper step 13 to the middle step 14, is provided only on the rear side of the door 12.

As described above, the boarding-steps driving mechanism 82, which drives the upper step 13, the middle step 14, and the lower step 15, is constituted of only the links using no gear, no sprocket, no chain, or the like. Accordingly, the structure of the boarding-steps driving mechanism 82 is simplified.

An end portion of the door opening/closing operation lever 28 on the opposite side to the grip 27 is not pivotally supported on a fixed point on the fuselage 11, but is pivotally supported with the fulcrum pin 29 on the upper end of the door driving link 30 whose position is changed. The fulcrum pin 29 is located inside the fuselage 11 in a state where the door 12 is fully closed, but is located outside the fuselage 11 in a state where the door 12 is opened at a predetermined angle or more. Accordingly, as indicated by the dashed line in FIG. 10, the movement trajectory of the grip 27 of the door opening/closing operation lever 28 is shifted in the outside direction of the fuselage 11 by an amount equivalent to a distance by which the position of the fulcrum pin 29 projects to the outside of the fuselage 11. This structure makes the door opening/closing operation lever 28 unlikely to interfere with the other members inside the fuselage 11, and enables an effective use of space. The alternate long and two short dashes line in FIG. 10 indicates the trajectory of the grip 27 of the door opening/closing operation lever 28, which is drawn on assumption that the fulcrum pin 29 is fixed to the fuselage 11.

The line shows that the movement trajectory of the grip 27 is closer to the center portion of the fuselage 11 than that of the embodiment.

As described above, according to the embodiment, the movement trajectory of the grip 27 of the door opening/closing operation lever 28 can be shifted in the outside direction of the fuselage 11. Accordingly, it is possible to elongate the door opening/closing operation lever 28 by an amount corresponding to the movement, and thus to allow the boarding steps 16 to be closed with a much less force.

As is clear from FIG. 1, the door opening/closing operation lever 28 is arranged in the direction of the arrangement of the upper step 13, the middle step 14, and the lower step 15 in the state where the door 12 is opened. Accordingly, it is possible to utilize the door opening/closing operation lever 28 as a grab rail for the boarding steps 16, and thus to eliminate the need for providing a special grab rail, thereby reducing the number of components.

As illustrated in FIG. 10, the boarding steps 16 are stored along the inner surface of the lower half portion of the door 12 in the state where the door 12 is closed. Accordingly, the window 18 (see FIGS. 1 and 10), which is provided in the upper half portion of the door 12, is not covered with the boarding steps 16 thus stored.

An embodiment of the present invention is explained above, but the present invention may be modified in a variety of ways as long as the modifications do not depart from the gist of the present invention.

For example, the door opening and closing apparatus according to the present invention may be employed not only in airplanes but also in any of aircrafts such as helicopters and airships.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A door opening and closing apparatus for an aircraft comprising a door opening and closing mechanism, in which a door for opening and closing an opening portion of a fuselage is pivotally supported at a lower end thereof on the fuselage, and is driven to open and close by the door opening and closing mechanism that is operated by a crew member from inside of the fuselage, wherein
the door opening and closing mechanism includes:
a first position restricting link having one end pivotally supported on the fuselage;
a second position restricting link having one end pivotally supported on the fuselage;
a door driving link having one end pivotally supported on the door, the other end of the second position restricting link being pivotally supported on a portion of the door driving link; and
a door opening/closing operation lever provided at one end thereof with a grip for being held by a crew member, the other end of the door opening/closing operation lever being pivotally supported on the other end of the door driving link, a portion of the door opening/closing operation lever being pivotally supported on the other end of the first position restricting link, and
the door driving link is pulled upward so as to swing the door from an opened position to a closed position thereof by pulling the grip of the door opening/closing operation lever toward the inside of the fuselage and thereafter pushing downwardly on the grip.

2. The door opening and closing apparatus for an aircraft according to claim 1, further comprising a plurality of steps on an inner surface of the door, wherein
in association with the swing of the door between the opened position and the closed position, each of the plurality of steps is swung between an expanded position and a stored position thereof by a boarding-steps driving mechanism.

3. The door opening and closing apparatus for an aircraft according to claim 2, wherein
the plurality of steps comprise an upper step, a middle step, and a lower step, and
the boarding-steps driving mechanism includes:
an upper-step supporting link connecting, to the door, the upper step swingably and pivotally supported on the door;
an upper-step driving link connecting the door driving link to the upper-step supporting link;
a middle-step supporting link connecting, to the door, the middle step pivotally supported on the door;
a middle-step driving link connecting the upper-step supporting link to the middle-step supporting link;
a lower-step supporting link connecting the lower step to the middle step; and
a lower-step driving link connecting the middle-step supporting link to the lower-step supporting link.

4. The door opening and closing apparatus for an aircraft, according to claim 2, wherein when the door is located in the opened position, the door opening/closing operation lever extends along the direction of the arrangement of the plurality of steps so as to function as a grab rail.

5. The door opening and closing apparatus for an aircraft, according to claim 3, wherein when the door is located in the opened position, the door opening/closing operation lever extends along the direction of the arrangement of the plurality of steps so as to function as a grab rail.

6. The door opening and closing apparatus for an aircraft, according to claim 1, wherein a fulcrum pin with which the other end of the door opening/closing operation lever is pivotally supported on the other end of the door driving link is located outside the fuselage at least when the door is located in the opened position.

7. The door opening and closing apparatus for an aircraft, according to claim 2, wherein a fulcrum pin with which the other end of the door opening/closing operation lever is pivotally supported on the other end of the door driving link is located outside the fuselage at least when the door is located in the opened position.

8. The door opening and closing apparatus for an aircraft, according to claim 3, wherein a fulcrum pin with which the other end of the door opening/closing operation lever is pivotally supported on the other end of the door driving link is located outside the fuselage at least when the door is located in the opened position.

9. The door opening and closing apparatus for an aircraft, according to claim 4, wherein a fulcrum pin with which the other end of the door opening/closing operation lever is pivotally supported on the other end of the door driving link is located outside the fuselage at least when the door is located in the opened position.

10. The door opening and closing apparatus for an aircraft, according to claim 5, wherein a fulcrum pin with which the other end of the door opening/closing operation lever is pivotally supported on the other end of the door driving link is located outside the fuselage at least when the door is located in the opened position.

11. A door opening and closing apparatus for an aircraft comprising a door opening and closing mechanism, in which a door for opening and closing an opening portion of a fuselage is pivotally supported at a lower end thereof on the fuselage, and is driven to open and close by the door opening and closing mechanism that is manually operated from inside of the fuselage, comprising:
- a first position restricting link having a proximal end and a distal end, said proximal end being pivotally supported on the fuselage;
- a second position restricting link having a proximal end and a distal end, said proximal end being pivotally supported on the fuselage;
- a door driving link having a first end and a second end, said first end being pivotally supported on the door, a distal end of the second position restricting link being pivotally supported between the first end and the second end of the door driving link; and
- a door opening/closing operation lever having a proximal end and a distal end, said proximal end forming a grip that is manually operated, the distal end of the door opening/closing operation lever being pivotally supported on the second end of the door driving link, said distal end of the first position restricting link being pivotally supported at a point between the proximal end and the distal end of the door opening/closing operation lever, and
- wherein the door driving link is manually pulled upward to swing the door from an opened position to a closed position thereof by pulling the grip of the door opening/closing operation lever toward the inside of the fuselage and thereafter manually pushing downwardly on the grip.

12. The door opening and closing apparatus for an aircraft according to claim 11, further comprising a plurality of steps on an inner surface of the door, wherein
- in association with the swing of the door between the opened position and the closed position, each of the plurality of steps is swung between an expanded position and a stored position thereof by a boarding-steps driving mechanism.

13. The door opening and closing apparatus for an aircraft according to claim 12, wherein
- the plurality of steps comprise an upper step, a middle step, and a lower step, and
- the boarding-steps driving mechanism includes:
  - an upper-step supporting link connecting, to the door, the upper step swingably and pivotally supported on the door;
  - an upper-step driving link connecting the door driving link to the upper-step supporting link;
  - a middle-step supporting link connecting, to the door, the middle step pivotally supported on the door;
  - a middle-step driving link connecting the upper-step supporting link to the middle-step supporting link;
  - a lower-step supporting link connecting the lower step to the middle step; and
  - a lower-step driving link connecting the middle-step supporting link to the lower-step supporting link.

14. The door opening and closing apparatus for an aircraft, according to claim 12, wherein when the door is located in the opened position, the door opening/closing operation lever extends along the direction of the arrangement of the plurality of steps so as to function as a grab rail.

15. The door opening and closing apparatus for an aircraft, according to claim 13, wherein when the door is located in the opened position, the door opening/closing operation lever extends along the direction of the arrangement of the plurality of steps so as to function as a grab rail.

16. The door opening and closing apparatus for an aircraft, according to claim 11, wherein a fulcrum pin with which the other end of the door opening/closing operation lever is pivotally supported on the other end of the door driving link is located outside the fuselage at least when the door is located in the opened position.

17. The door opening and closing apparatus for an aircraft, according to claim 12, wherein a fulcrum pin with which the distal end of the door opening/closing operation lever is pivotally supported on the second end of the door driving link is located outside the fuselage at least when the door is located in the opened position.

18. The door opening and closing apparatus for an aircraft, according to claim 13, wherein a fulcrum pin with which the distal end of the door opening/closing operation lever is pivotally supported on the second end of the door driving link is located outside the fuselage at least when the door is located in the opened position.

19. The door opening and closing apparatus for an aircraft, according to claim 14, wherein a fulcrum pin with which the distal end of the door opening/closing operation lever is pivotally supported on the second end of the door driving link is located outside the fuselage at least when the door is located in the opened position.

20. The door opening and closing apparatus for an aircraft, according to claim 15, wherein a fulcrum pin with which the distal end of the door opening/closing operation lever is pivotally supported on the second end of the door driving link is located outside the fuselage at least when the door is located in the opened position.

* * * * *